United States Patent [19]

Townsend

[11] Patent Number: 5,609,519
[45] Date of Patent: Mar. 11, 1997

[54] METHOD AND MEANS OF SKINNING HAM CHUNKS

[76] Inventor: Ray T. Townsend, 3131 Fleur Dr., Des Moines, Iowa 50321

[21] Appl. No.: 678,663
[22] Filed: Jul. 11, 1996
[51] Int. Cl.⁶ .............................. A22B 5/16; A22C 17/12
[52] U.S. Cl. .................... 452/127; 83/105; 99/589
[58] Field of Search ................................. 452/127, 125; 83/105; 99/589

[56] References Cited

U.S. PATENT DOCUMENTS

| | | | |
|---|---|---|---|
| 2,261,589 | 11/1941 | Piper | 452/127 |
| 2,715,427 | 8/1955 | Townsend | 452/127 |
| 5,350,334 | 9/1994 | Holms | 452/127 |
| 5,399,118 | 3/1995 | Long et al. | 452/127 |

FOREIGN PATENT DOCUMENTS 2475855  8/1981  France ................................. 452/127

Primary Examiner—Willis Little
Attorney, Agent, or Firm—Zarley, McKee, Thomte, Voorhees, & Sease

[57] ABSTRACT

A meat skinning machine has a supporting surface with a discharge edge adjacent the surface of a toothed gripper roll, with an elongated skinning blade spaced from and opposite to the discharge edge. A curved deflector plate is located downstream from the blade and curves upwardly and rearwardly to cause a chunk of meat departing the blade to move upwardly and rearwardly for redeposit on the supporting surface. A method of skinning a meat product with a gripper roll and a blade by moving a skinned chunk of meat upwardly and rearwardly with respect to the blade after departing the blade for purposes of skinning another surface of the meat chunk.

5 Claims, 2 Drawing Sheets

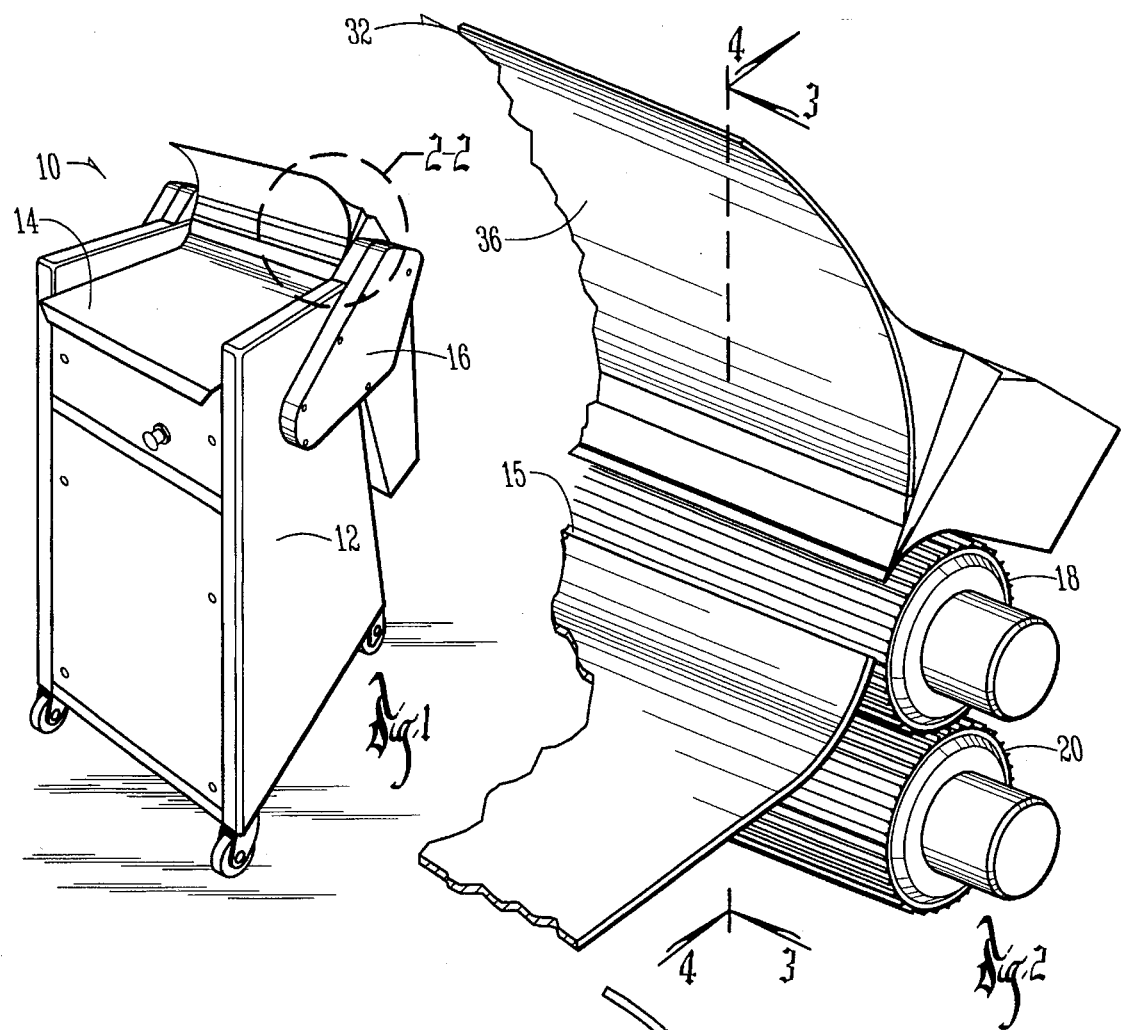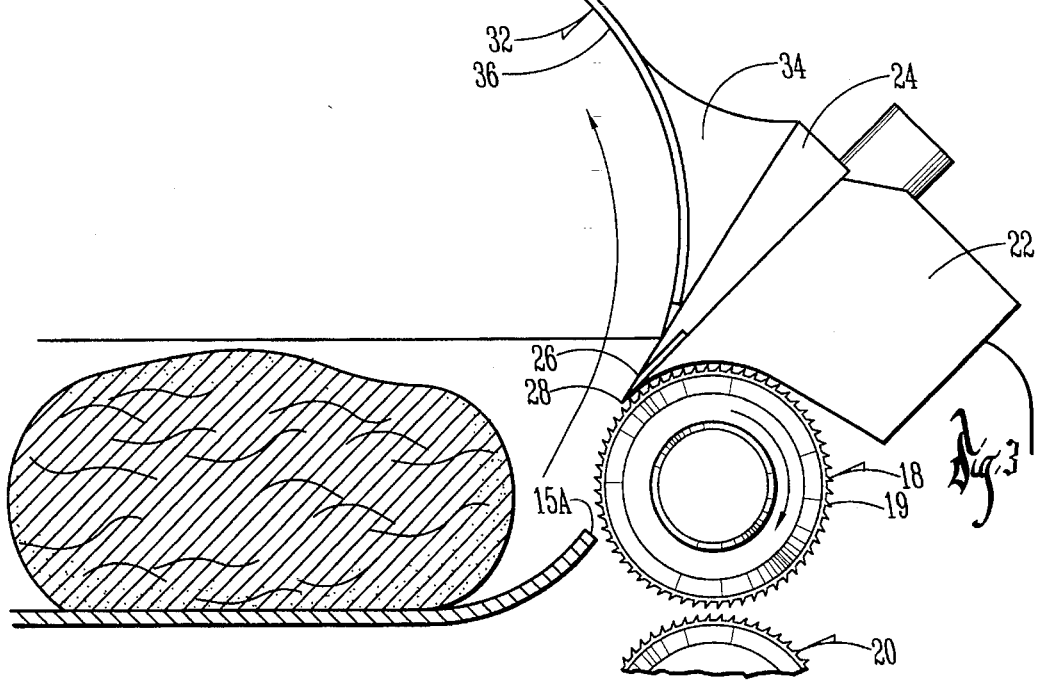

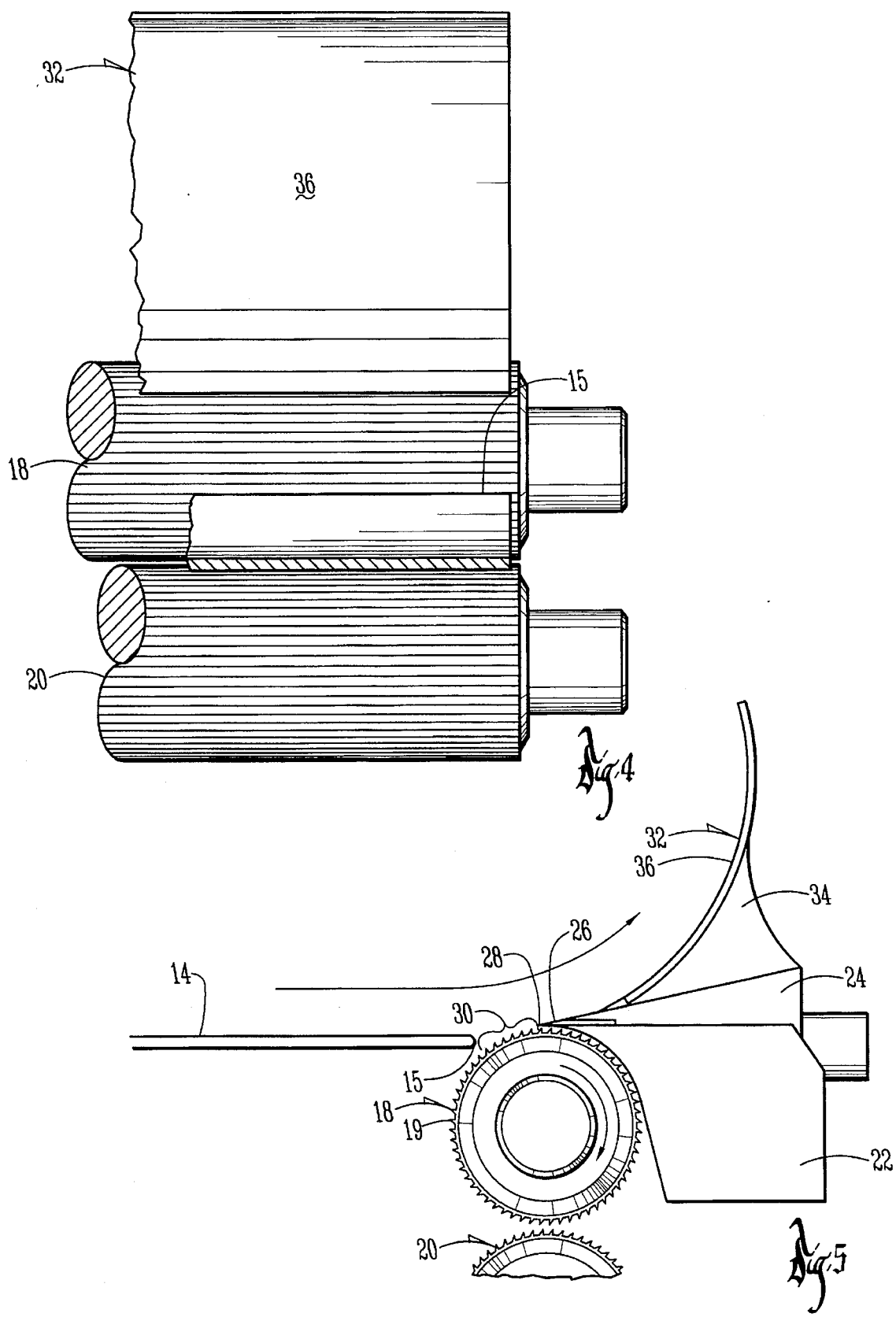

METHOD AND MEANS OF SKINNING HAM CHUNKS

BACKGROUND OF THE INVENTION

The most popular way of preparing hams in meat processing plants today is to separate the ham muscle at the membrane line between the muscles, remove the membrane from the surface of the muscles, and then reassemble the muscles into one large piece of ham that has no membrane therein. As the muscles are separated, the membrane between them is left on the side of one muscle or the other, and conventional skinning machines are the most practical for removing the membrane. Consequently, a plurality of small chunks of ham that have membrane irregularly spread over their surfaces need to be fed through the skinning machine. One of the problems of this process is that these chunks of ham with irregular patches of membrane may need to be fed through the machine more than once to remove all of the patches of membrane. Reaching across the skinner to retrieve a chunk of ham for another pass can be dangerous to the operator. Consequently, several conveyor means have been developed to convey the chunks back to the front of the machine so that they can be fed back through the machine to remove membranes from other surfaces on the chunk. This avoids reaching across the machine, but often results in both sides of the chunk being skinned automatically, whether it needs it or not. This causes wastage of the ham meat and reduces the net yield of the meat product.

For the last fifty years, skinning machines have had the skinning blade on the top of the tooth or gripper roll and with a horizontal table or surface to hand feed the product horizontally into the blade and across the top of the machine.

It is therefore a principal object of this invention to provide a method and means for removing skin or membrane from ham chunks which will cause the ham chunks to immediately return to the point of beginning to have other surfaces thereon skinned by means of a curved deflector plate located immediately beyond the skinning blade of the skinning machine.

A further object of this invention is to provide a method and means for removing skin or membrane from ham chunks which is safe to operate, and which will serve to produce a higher yield on the meat product being skinned.

These and other objects will be apparent to those skilled in the art.

SUMMARY OF THE INVENTION

This invention involves the skinning blade and shoe assembly being rotated forward toward the operator where the teeth of the gripper roll are moving in an upward direction in front of the operator. As the membrane is fed into the blade in this position, the ham chunk is carried up in front of the shoe which causes the chunk to fall back on the table in front of the operator. It is very easy for the operator to refeed the chunk back into the blade in the exact place of the patch of membrane, and only if there is a patch to take off. Since the operator doesn't need to reach across the blade, the safety has been improved considerably. The shoe has a curved surface which reverses the route of the ham chunks. This curved surface will also be adaptable to conventional skinning machines wherein the supporting surface and blade are tangentially aligned with the outer surface of the tooth roll.

BRIEF DESCRIPTION OF THE DRAWINGS

FIG. 1 is a perspective view of one embodiment of the skinning machine of this invention;

FIG. 2 is an enlarged scale partial perspective view thereof taken on line 2—2 of FIG. 1;

FIG. 3 is an enlarged sectional view taken on line 3—3 of FIG. 2;

FIG. 4 is an enlarged scale partial elevational view taken on line 4—4 of FIG. 2; and FIG. 5 is a side elevational view similar to that of FIG. 3 of an alternate embodiment of the invention.

DESCRIPTION OF THE PREFERRED EMBODIMENT

Except for the specific structure of this invention, FIG. 1 shows a conventional skinning machine 10 having a frame 12 and a meat supporting surface 14. The meat supporting surface has a conventional discharge edge 15 (Fig. 5). A drive train connected to a source of power (not shown) is designated by the numeral 16. A conventional gripper roll or tooth roll 18 (FIG. 5) is located just beyond the discharge edge 15 of supporting surface 14. The gripper roll 18 has a conventional toothed outer surface 19 which is adapted to grip the meat product as will be discussed hereafter. A conventional skin stripping roll 20 is located immediately below the gripper roll 18 to help separate the separated membrane or skin from the roll 18.

Again with reference to FIG. 5, a conventional shoe with an arcuate surface embracing a portion of gripper roll 18 is mounted on frame 12. Shoe 22 supports blade holder 24 which in turn supports an elongated cutting blade 26 having a cutting edge 28. The blade 26 is elongated and is parallel to the axis of gripper roll 18. As seen in FIG. 5, the blade 26 and the supporting surface 14 are in substantial horizontal alignment with an exposed outer surface portion 30 of roll 18 being tangiently aligned therebetween.

A curved deflector plate 32 (FIG. 5) is supported on blade holder 24 by any conventional means such as by bracket 34. Plate 32 has a curved surface 32 which is curved upwardly and slightly rearwardly with respect to the blade 26.

The form of the invention shown in FIGS. 1–4 is similar to that shown in FIG. 5 except that the support surface 14 has a meat discharge edge 15A which is curved slightly upwardly with respect to the horizontal portion of the supporting surface. In addition, the location of the gripping roll 18 (and the stripping roll 20) has been slightly elevated with respect to the positions thereof shown in FIG. 5 whereupon the exposed outer surface portion 30 of the roll 18 is substantially tangentially aligned not only with the discharge edge 15A, but also with the blade 26 (see FIG. 3). The blade 26 along with shoe 22, and blade holder 24 have been raised and tilted at an angle with respect to the horizontal supporting surface 14. In this embodiment, the curved surface 36 of deflector plate 32 extends both upwardly and in a more rearwardly direction than the position of blade 32 in FIG. 5. However, both the deflector plates 32 in FIGS. 3 and 5 are capable of deflecting ham chunks departing blade 36 in a rearwardly direction (towards the operator) for redeposit on the supporting surface 14. The momentum imparted to the chunks of ham by blade 18 cause the ham chunks to move past blade 26 and thence upwardly and rearwardly on the curved plates 32.

As a result of this invention, a ham chunk can have a surface skinned and immediately and automatically returned to the support surface 14 for a second skinning operation on a different surface of the ham chunk. As a result, the operation is very safe because the operator does not need to in any way reach across the gripping roll to retrieve a skinned chunk of ham. Further, the operation can be conducted much more quickly because the ham chunks are instantly returned to position for reskinning as soon as the initial skinning operation is completed.

Thus from the foregoing, it is seen that this invention will accomplish at least all of its stated objectives.

What is claimed is:

1. A meat skinning machine having a frame, a substantially horizontal meat supporting member on the frame having a forward meat discharge edge, a rotatable meat gripping roll rotatably mounted on the frame and having a plurality of gripping teeth thereon and being located adjacent said discharge edge, an elongated meat skinning blade adjacent said gripping roll and adapted to remove membranes or the like from a piece of meat moved from said supporting member and pulled into contact with the blade by the gripper roll, the improvement comprising, a curved deflector plate mounted on said frame adjacent said curved blade, said deflector plate extending upwardly and rearwardly with respect to said blade so that a piece of meat moved into contact with said blade by said gripping roll will depart the blade and will move upwardly and rearwardly on said curved deflector plate by the momentum imposed thereon by said gripping roll, and will thereupon drop on said supporting member.

2. The device of claim 1 wherein said supporting member and said blade are in a substantially horizontal position.

3. The device of claim 1 wherein said supporting member and said blade are in a substantially horizontal position, and are substantially tangentially aligned with the outer surface of said gripping roll.

4. The device of claim 1 wherein supporting member is substantially horizontal, and said discharge edge of said supporting member is curved upwardly at an angle with respect to said supporting member, a portion of the outer surface of said gripping roll being adjacent said discharge edge to grip a meat product being moved forwardly and upwardly over said discharge edge, said blade being tangentially aligned with the portion of the outer surface of said gripping roll adjacent said discharge edge, and also being angularly disposed with respect to said support member.

5. A method of skinning a meat product comprising the steps of:

moving a piece of meat product forwardly from a support surface towards the surface of a gripper roll and the cutting edge of a blade aligned with and adjacent to said gripping roll, allowing said meat product to be gripped by said gripping roll and moved by said gripping roll into a skinning relationship with said blade, and causing said meat product departing said skinning blade to be deflected upwardly and rearwardly by a curved surface, so as to be redeposited on said supporting surface.

\* \* \* \* \*